(12) United States Patent
Zisimopoulos et al.

(10) Patent No.: US 9,231,835 B2
(45) Date of Patent: Jan. 5, 2016

(54) METHOD AND APPARATUS FOR QUALITY OF SERVICE CONTROL FOR A USER EQUIPMENT

(75) Inventors: Haris Zisimopoulos, London (GB); Erik Guttman, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 14/110,014

(22) PCT Filed: Mar. 29, 2012

(86) PCT No.: PCT/KR2012/002317
§ 371 (c)(1),
(2), (4) Date: Dec. 20, 2013

(87) PCT Pub. No.: WO2012/138078
PCT Pub. Date: Oct. 11, 2012

(65) Prior Publication Data
US 2014/0115159 A1    Apr. 24, 2014

(30) Foreign Application Priority Data

Apr. 4, 2011   (GB) .................................. 1105701.5

(51) Int. Cl.
| | |
|---|---|
| *H04L 12/26* | (2006.01) |
| *H04L 12/24* | (2006.01) |
| *H04W 28/24* | (2009.01) |
| *H04M 15/00* | (2006.01) |
| *H04W 12/08* | (2009.01) |
| *H04W 28/06* | (2009.01) |
| *H04W 36/14* | (2009.01) |

(52) U.S. Cl.
CPC ............ *H04L 41/50* (2013.01); *H04L 41/5025* (2013.01); *H04L 41/5051* (2013.01);
(Continued)

(58) Field of Classification Search
CPC ........ H04L 12/14; H04W 8/08; H04W 28/02; G06Q 20/102
USPC ........................... 370/252; 455/433, 435, 461
See application file for complete search history.

(56) References Cited

U.S. PATENT DOCUMENTS

| | | | |
|---|---|---|---|
| 2002/0151312 | A1 | 10/2002 | Rosemarijn Bos et al. |
| 2005/0128963 | A1 | 6/2005 | Gazda et al. |

(Continued)

FOREIGN PATENT DOCUMENTS

| | | |
|---|---|---|
| EP | 1 250 023 A1 | 10/2002 |
| EP | 2083601 A1 | 7/2009 |

(Continued)

*Primary Examiner* — Wanda Z Russell
(74) *Attorney, Agent, or Firm* — Jefferson IP Law, LLP

(57) ABSTRACT

The present invention relates generally to communication systems, and more specifically, but not exclusively to a method and apparatus for quality of service control for a user equipment in a communication system comprising a home network with respect to the user equipment and a visited network. In accordance with a first aspect of the present invention, there is provided a method of quality of service control for a user equipment in a communication system comprising a first network and a second network, the first network being a home network with respect to said user equipment and the second network being a visited network with respect to said user equipment, the method comprising: receiving authorization information at said user equipment from the first network, said authorization information having data related to an entitlement to quality of service for said user equipment; holding said authorization information at said user equipment; performing a comparison of said entitlement to quality of service with a quality of service provided by the second network; and in dependence on said comparison, sending a message from said user equipment to the second network requesting an upgrade of quality of service.

34 Claims, 12 Drawing Sheets

(52) U.S. Cl.
CPC .............. *H04M15/66* (2013.01); *H04M 15/80* (2013.01); *H04M 15/8016* (2013.01); *H04M 15/8038* (2013.01); *H04W 28/24* (2013.01); *H04L 41/0806* (2013.01); *H04L 41/5029* (2013.01); *H04L 41/5067* (2013.01); *H04W 12/08* (2013.01); *H04W 28/06* (2013.01); *H04W 36/14* (2013.01)

(56) References Cited

U.S. PATENT DOCUMENTS

| | | | |
|---|---|---|---|
| 2007/0207818 A1* | 9/2007 | Rosenberg | G06Q 20/102 455/461 |
| 2008/0107119 A1 | 5/2008 | Chen et al. | |
| 2008/0299911 A1 | 12/2008 | Chen et al. | |
| 2009/0262707 A1 | 10/2009 | Wu et al. | |
| 2009/0270099 A1* | 10/2009 | Gallagher | H04W 8/08 455/435.1 |
| 2010/0195503 A1* | 8/2010 | Raleigh | H04W 28/0268 370/235 |
| 2011/0208853 A1 | 8/2011 | Castro-Castro et al. | |
| 2012/0021741 A1* | 1/2012 | Pancorbo Marcos | H04L 12/14 455/433 |

FOREIGN PATENT DOCUMENTS

| | | |
|---|---|---|
| WO | 2008/063545 A1 | 5/2008 |
| WO | 2009-155438 A1 | 12/2009 |
| WO | 2010/049002 A1 | 5/2010 |

\* cited by examiner

Fig. 10

```
P - Auth - QoS - upgrade      = "P - Auth - QoS - upgrade" HCOLON auth - token
                                * (SEMI auth - upgrade)

auth - upgrade - spec  =  auth - upgrade    * (SEMI qos - prams)
auth - upgrade         =  auth - token / home - net - rules / gen - value
auth - token           =  "auth - token" EQUAL gen - valeu
charging - key         =  0* [HEXDIGIT] ; opaque charging key encoding
home - net - rules     =  "S9 - used" / "S9 - not - used" / token
qoS - params           =  qci / mbr - uL /
                          mbr - dl / gbr - ul /
                          gbr - dl / generic - param
qci                    =  "qci" EQUAL gen - value
mbr - ul               =  "mbr - ul" EQUAL gen - value
mbr - ul               =  "mbr - dl" EQUAL gen - value
gbr - ul               =  "gbr - ul" EQUAL gen - value
gbr - dl               =  "gbr - dl" EQUAL gen - value
```

METHOD AND APPARATUS FOR QUALITY OF SERVICE CONTROL FOR A USER EQUIPMENT

TECHNICAL FIELD

The present invention relates generally to communication systems, and more specifically, but not exclusively to a method and apparatus for quality of service control for a user equipment in a communication system comprising a home network with respect to the user equipment and a visited network.

BACKGROUND ART

A communication system may comprise a number of networks among which a user equipment may roam. For example, a wireless communication system may comprise a number of wireless networks, each wireless network being, for example, a public land mobile network (PLMN). A user equipment may be subscribed to a home network, referred as a home PLMN (HPLMN) and may roam to a visited network, referred to as a visited PLMN (VPLMN).

Typically, a user equipment may be allocated a Quality of Service (QoS) by the home network, that may, for example, include a Guaranteed Bit Rate (GBR), which may be allocated according to a service offered. In particular, a home network may provide services that require higher than normal quality of service to only a subset of its users, for example to users of high definition streaming video for large screen devices. However, when a user equipment is roaming, the visited network may offer only a default quality of service, that may not be satisfactory for users who are accustomed to receiving a higher quality of service from their home network.

In existing systems, it may be possible for a visited network and the home network to communicate to negotiate the provision of an appropriate quality of service for a user equipment by a signalling link, such as a "S9" link. However, such signalling links are not provided between all networks. Furthermore, even when a signalling link such as S9 is provided, the service offerings of the home and visited networks may differ, in particular in relation to video services, for which there are typically a large variety of coding/decoding schemes and encoding rates. As a result, the validation of quality of service provision rules using the signalling link may fail, and the visited network may apply default rules for a particular service. For example, a home network may wish to guarantee high definition (HD) H.264 video at 384 kbps, but if rule validation fails or the signalling link is absent, the visited network may provide the default guaranteed bit rate for H.264, which is 64 kbps, which may be too low for, in particular, large screen devices.

DISCLOSURE OF INVENTION

Technical Problem

It is an object of the invention to mitigate the problems with the prior art systems.

Solution to Problem

In accordance with a first aspect of the present invention, there is provided a method of quality of service control for a user equipment in a communication system comprising a first network and a second network, the first network being a home network with respect to said user equipment and the second network being a visited network with respect to said user equipment, the method comprising:

receiving authorisation information at said user equipment from the first network, said authorisation information having data related to an entitlement to quality of service for said user equipment;

holding said authorisation information at said user equipment;

performing a comparison of said entitlement to quality of service with a quality of service provided by the second network; and in dependence on said comparison, sending a message from said user equipment to the second network requesting an upgrade of quality of service.

This has an advantage of providing a mechanism for the user equipment to control a quality of service at least by requesting an upgrade, in the event that a quality of service provided by a network is lower than a quality of service entitlement, even when in a visited network.

In an embodiment of the invention, said receiving of said authorisation information at said user equipment is as a result of application session signalling, such as for example Session Initiation Protocol (SIP) session signalling. This provides a convenient method receiving the authorisation information.

In an embodiment of the invention, said receiving of said authorisation information at said user equipment is as a result of a pre-configuration of said user equipment by the first network. Said pre-configuration may be performed using Open Mobile Alliance (OMA) Device Management (DM) protocol, and may be performed prior to initiating or receiving application session signalling at said user equipment.

In an embodiment of the invention, said sending of the message from said user equipment to the second network requesting the upgrade of quality of service is in further dependence on a determination that the quality of service provided by the second network has been set by reference to rules received from the first network.

In an embodiment of the invention, said determination that the quality of service provided by the second network has been set by reference to rules received from the first network is based on information received at said user equipment relating to whether or not a given signalling link is deployed between the first and second networks.

In an embodiment of the invention, said given signalling link is a S9 link.

This has an advantage that signalling may be reduced, since if the visited network has set the provided quality of service by reference to rules received from the home network, then it may be assumed unlikely that a further upgrade would be provided, so that a message need not be sent.

In an embodiment of the invention, said sending of the message from said user equipment to the second network requesting the upgrade of quality of service is in further dependence on an input from a user of the user equipment requesting an upgrade of quality of service. A message may be displayed to a user conveying charging information, whereby the user may decide whether or not to request an upgrade of quality of service. This has an advantage that a user may decide whether to request an upgrade based on charging information.

In an embodiment of the invention, said message to the user conveying charging information is determined on the basis of receipt of a charging key from the second network. This provides a convenient method to convey charging information.

In an embodiment of the invention, said sending of the message from said user equipment to the second network requesting the upgrade of quality of service is in further dependence on a pre-configured rule held at the user equipment. This has an advantage that it may not be necessary for a user to specifically make an input before the upgrade request message is sent.

In an embodiment of the invention, said pre-configured rule is configured by the user as an application setting of the user equipment.

In an embodiment of the invention, said sending of the message from said user equipment to the second network requesting the upgrade of quality of service is in accordance with a resource request procedure configured at the user equipment.

In an embodiment of the invention, said sending of the message from said user equipment to the second network requesting the upgrade of quality of service is in further dependence on an indication of a quality of service requirement for acceptable performance received from the second network. This has an advantage that the sending of an upgrade request may be avoided if an upgrade is unnecessary for a particular service.

In an embodiment of the invention, the method comprises:
sending said authorisation information from the first network to the second network, whereby the second network may authorise the requested upgrade of quality of service.

In an embodiment of the invention, said sending of said authorisation information from the first network to the second network is by application function (AF) signalling.

In an embodiment of the invention, the method comprises:
holding said authorisation information at an application function of the second network; and
providing authorisation for the requested upgrade from the application function to a policy server in the second network.

In an embodiment of the invention, the method comprises:
modifying said authorisation information held at the application function to include information as to whether the quality of service provided by the second network has been set by reference a rule received from the first network.

In an embodiment of the invention, the method comprises:
validating said authorisation information received by the second network from said user equipment at the policy server of the second network.

In an embodiment of the invention, the method comprises:
performing said validating based on a digital signature contained in said authorisation information.

In an embodiment of the invention, the method comprises:
authorising resource allocation at the policy server dependent on a comparison of the upgrade of quality of service requested by the user equipment and the information related to an allowed quality of service carried by said authorisation information.

In an embodiment of the invention, the method comprises:
sending said authorisation information from said user equipment to the second network, whereby the second network may authorise the requested upgrade.

In an embodiment of the invention, said authorisation information constitutes at least part of an authorisation token.

In an embodiment of the invention, said authorisation information relates to a Guaranteed Bit Rate (GBR) or a Maximum Bit Rate (MBR) to which the user equipment is entitled.

In an embodiment of the invention, said authorisation information relates to charging information for an upgrade.

In an embodiment of the invention, said authorisation information relates to whether or not a given signalling link is deployed between the first and second networks.

In an embodiment of the invention, said given signalling link is a S9 link.

In an embodiment of the invention, said communication system is a wireless communication system, said first network is a wireless network and said second network is a wireless network.

In an embodiment of the invention, said authorisation information relates to an upgrade limit.

In an embodiment of the invention, said entitlement to a quality of service relates to a service for said user equipment.

In accordance with a second aspect of the present invention, there is provided user equipment for use in a communication system comprising a first network and a second network, the first network being a home network with respect to said user equipment and the second network being a visited network with respect to said user equipment, the user equipment being arranged to:
receive authorisation information from the first network, said authorisation information having data related to an entitlement to quality of service for said user equipment;
hold said authorisation information;
perform a comparison of said entitlement to quality of service with a quality of service provided by the second network; and
in dependence on said comparison, send a message to the second network requesting an upgrade of quality of service.

In accordance with a third aspect of the present invention, there is provided a server for use in a communication system comprising a first network and a second network, the first network being a home network with respect to a given user equipment and the second network being a visited network with respect to the given user equipment, the server being arranged to:
receive a message from the given user equipment requesting an upgrade of quality of service;
perform a comparison of said requested upgrade to authorisation information having information related to an allowed quality of service for the given user equipment; and
authorise resource allocation dependent on said comparison.

Further features and advantages of the invention will be apparent form the following description of preferred embodiments of the invention, which are given by way of example only.

Advantageous Effects of Invention

Firstly, the present invention has an advantage of providing a mechanism for the user equipment to control a quality of service at least by requesting an upgrade, in the event that a quality of service provided by a network is lower than a quality of service entitlement, even when in a visited network.

Secondly, the present invention has an advantage that signalling may be reduced, since if the visited network has set the provided quality of service by reference to rules received from the home network, then it may be assumed unlikely that a further upgrade would be provided, so that a message need not be sent.

Thirdly, the present invention has an advantage that a user may decide whether to request an upgrade based on charging information.

Fourthly, the present invention has an advantage that it may not be necessary for a user to specifically make an input before the upgrade request message is sent.

Fifthly, the present invention has an advantage that the sending of an upgrade request may be avoided if an upgrade is unnecessary for a particular service.

BRIEF DESCRIPTION OF DRAWINGS

FIG. 10 is a schematic diagram showing a SIP P-header format for an authorisation token for quality of service upgrade in an embodiment of the invention;

MODE FOR THE INVENTION

Figure 1:
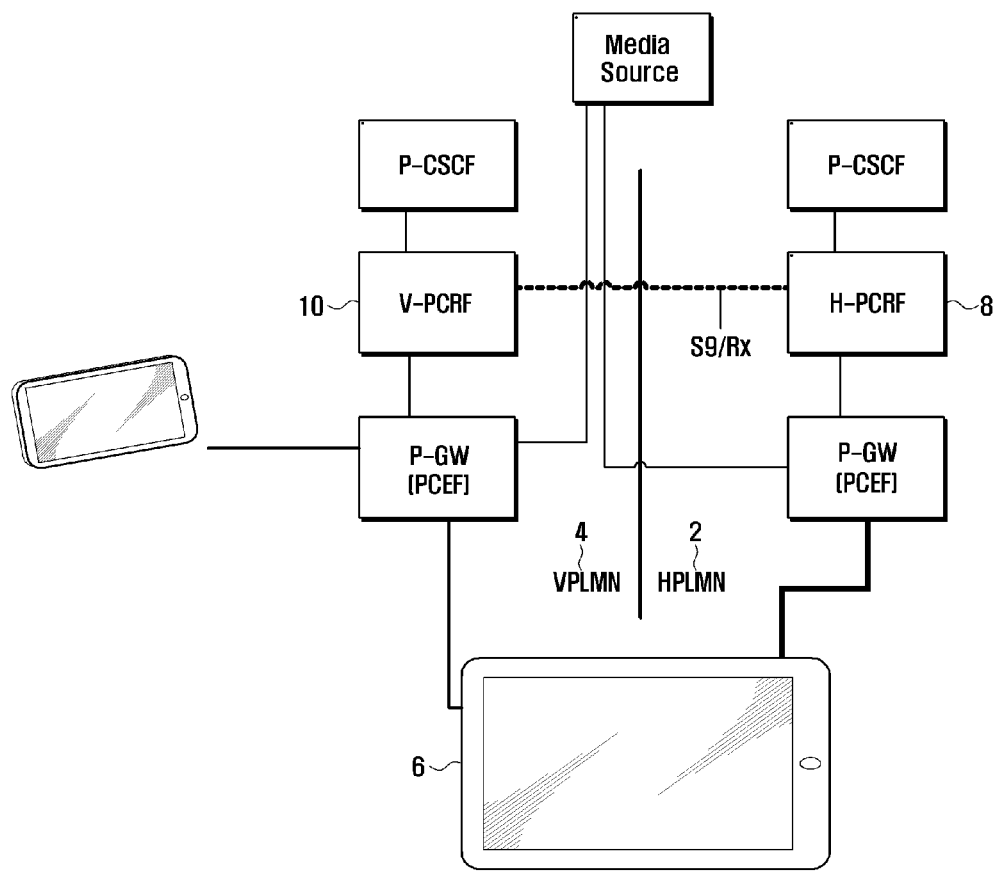
FIG. 1 is a schematic diagram showing use of Multimedia Telephony Service for Internet Protocol Multimedia Subsystem (MTSI) in a roaming situation.

By way of example a first embodiment of the invention will now be described in the context of a wireless communications system including a home wireless network and a visited wireless networks with respect to a user equipment; the home and visited wireless networks support communication using E-UTRA/LTE radio access technology, as associated with E-UTRAN networks in LTE systems. However, it will be understood that this is by way of example only and that other embodiments may involve wireless networks using other radio access technologies, such as IEEE802.16 WiMax systems, and that embodiments are not limited to wireless networks or a wireless communications system; for example, embodiments of the invention may relate to fixed line networks.

The first embodiment relates to a method of requesting an upgrade of quality of service for a user equipment. The user equipment receives, from the home network, authorisation information related to an entitlement to quality of service. The authorisation information may be in the form of an authorisation token, and the authorisation token may be received as a result of application session signalling such as for example Session Initiation Protocol (SIP) session signalling, or alternatively as a result of a pre-configuration of the user equipment by the home network. For example, the pre-configuration may be performed using Open Mobile Alliance (OMA) Device Management (DM) protocol, and may be performed prior to receiving application session signalling at the user equipment.

The user equipment then stores the authorisation information, which may be the authorisation token. The user equipment may roam to a visited network, and receive a service from the visited network. The user equipment may compare the entitlement to a quality of service indicated by the authorisation information with a quality of service provided by the visited network. The user equipment may then send a message to the visited network requesting an upgrade of quality of service, if the comparison indicated that the user equipment is entitled to the upgrade.

The user equipment may decide not to send the message requesting the upgrade, if it has been determined that the quality of service provided by the visited network has been set by reference to rules received from the home network. This determination may be made on the basis of information received at said user equipment relating to whether or not a given signalling link is deployed between the home and visited networks, for example a S9 signalling link. If the visited network has set the provided quality of service by reference to rules received from the home network, then it may be assumed unlikely that a further upgrade would be provided, so that a message need not be sent.

The sending of the message requesting the upgrade may also be dependent on an input from a user of the user equipment, who may request an upgrade of quality of service. A message may be displayed to the user conveying charging information, so that the user may decide whether or not to request an upgrade of quality of service. The charging information may be received in the form of a charging key from the visited network.

In an embodiment of the invention, it may not be necessary for a user to specifically make an input before the upgrade request message is sent; the message may be sent based on a pre-configured rule held at the user equipment. The sending of the message may depend on an indication of a quality of service requirement for acceptable performance received from the visited network; it may be that an upgrade is unnecessary for a particular service. A resource request procedure may be configured at the user equipment for sending the message.

In an embodiment of the invention, the authorisation information, which may be an authorisation token, is sent from the home network to the visited network, for use by the visited network in authorising the requested upgrade of quality of service. The authorisation information may be sent, for example, by application function (AF) signalling. The authorisation information may be stored at an application function of the visited network, and authorisation for the requested upgrade may be provided from the application function to a policy server in the visited network. The authorisation information, which may be an authorisation token, held at the application function may be modified to include information as to whether the quality of service provided by the visited network has been set by reference a rule received from the first network, so that, as previously mentioned, the user equipment may decide whether or not to request an upgrade.

In an embodiment of the invention, authorisation information received by the visited network from the user equipment is validated at the policy server of the visited network; this may, for example, be performed on the basis of a digital signature contained in the authorisation information. The policy server may authorise resource allocation dependent on a comparison of the upgrade of quality of service requested by the user equipment and the information related to an allowed quality of service carried by the authorisation information.

In an embodiment of the invention, the authorisation information may be sent from the user equipment to the visited network, so that the visited network may authorise the requested upgrade.

In an embodiment of the invention, the authorisation information may relate to a Guaranteed Bit Rate (GBR) or a Maximum Bit Rate (MBR) to which the user equipment is entitled. The authorisation information may also relate to charging information for an upgrade, and to whether or not a given signalling link, such as a S9 link, is deployed between the home and visited networks.

Embodiments of the invention will now be described in more detail.

In existing systems, there is a possible inconsistency in the allocation of Guaranteed Bit Rate (GBR) in roaming situations. When it is possible that Maximum Bit Rate (MBR) is greater than GBR, an inadequate GBR may be allocated and the user equipment (UE) may not have any means to indicate to the network the desired GBR as part of the session initiation protocol/session description protocol (SIP/SDP) session negotiation since the "b=AS" value (a parameter in SDP protocol) is primarily used to derive the MBR. In existing systems, it may not be required for the UE to signal the desired GBR and this may be implicitly derived from visited public land mobile network (VPLMN), that is the visited network, policies that are subject to roaming agreements. Signalling between the home public land mobile network (HPLMN), that is the visited network, and the VPLMN, such as S9 signalling (see FIG. 1) can be used in order to negotiate the appropriated GBR and/or MBR between HPLMN and VPLMN. There may be a set of recommended values for commonly used services that could be used by the VPLMN in case S9 is not used. The existing systems may be applicable to the majority of commonly used services that could be profiled identically (i.e. identified and assigned the same default QoS parameters) by both VPLMN and HPLMN.

However, a HPLMN may provide services that require higher than normal/default quality of service (QoS) to only a subset of its users, e.g. high definition streaming video for large screen devices. For high definition (HD) video, the recommended minimum GBR may not be satisfactory. In this situation, an embodiment of the invention enables the UE to provide the user with an option to choose to request more resources; the request may have charging implications depending on the agreement the user may have with the HPLMN.

Figure 9:
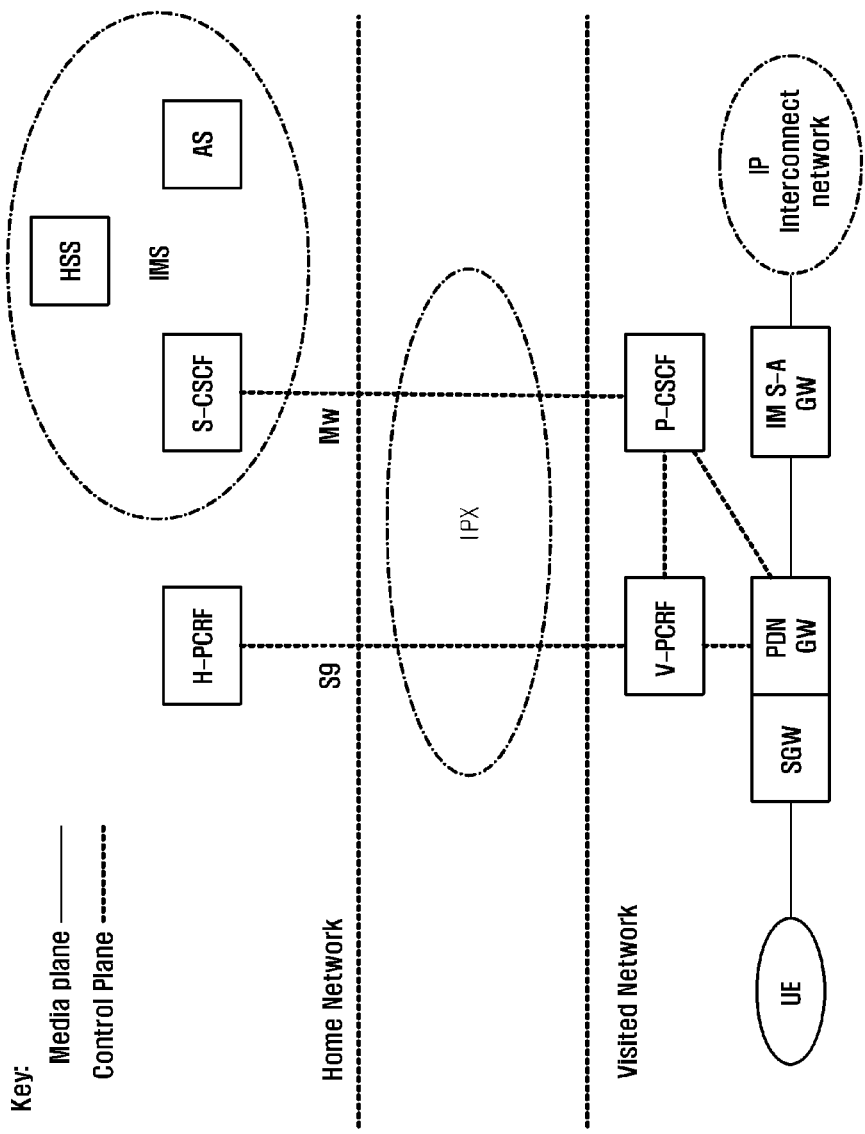
FIG. 9 is a schematic diagram showing a roaming architecture for Internet Protocol Multimedia Subsystem (IMS) services.

FIG. 1 illustrates a case in which a user roams to a VPLMN 4, using roaming architecture shown in FIG. 9, and the VPLMN 4 does not validate the HPLMN 2 rules and/or S9 is not used. In the VPLMN the UE receives the default GBR, and this GBR proves lower than expected/desired. The subscriber normally enjoys HD video in his HPLMN but now he has to cope with lower quality. An embodiment of the invention provides the user with a choice. For example, the user could receive a message in the user interface indicating, for example: "The VPLMN does not support HD video. If you want HD video you need to pay X". In other words, if the user gets a lower QoS than desired, he might ask for an upgrade but it may cost more.

The limitations of current systems with respect to quality of service upgrades arise in particular for video services. Given the multitude of codecs, encoding rates and so on, the service offerings of the VPLMN 4 and HPLMN 8 may be likely to differ. This may cause QoS validation of the rules provided over S9 to fail and the VPLMN to enforce the default rules it has for the particular service. Furthermore, S9 may not be deployed in some circumstances and in current systems the UE may not be aware of whether S9 is deployed and used. There may be different operator products/offerings using multimedia telephony service for internet protocol multimedia subsystem (MTSI) profiles that different operators use based on the types of devices and other factors and the VPLMN may not necessarily understand or need to understand these combinations. For example, one operator may want to guarantee HD H.264 video e.g. 384 kbps. The default GBR for H.264 is 64 kbps, will prove too low for large screen devices.

Figure 2:
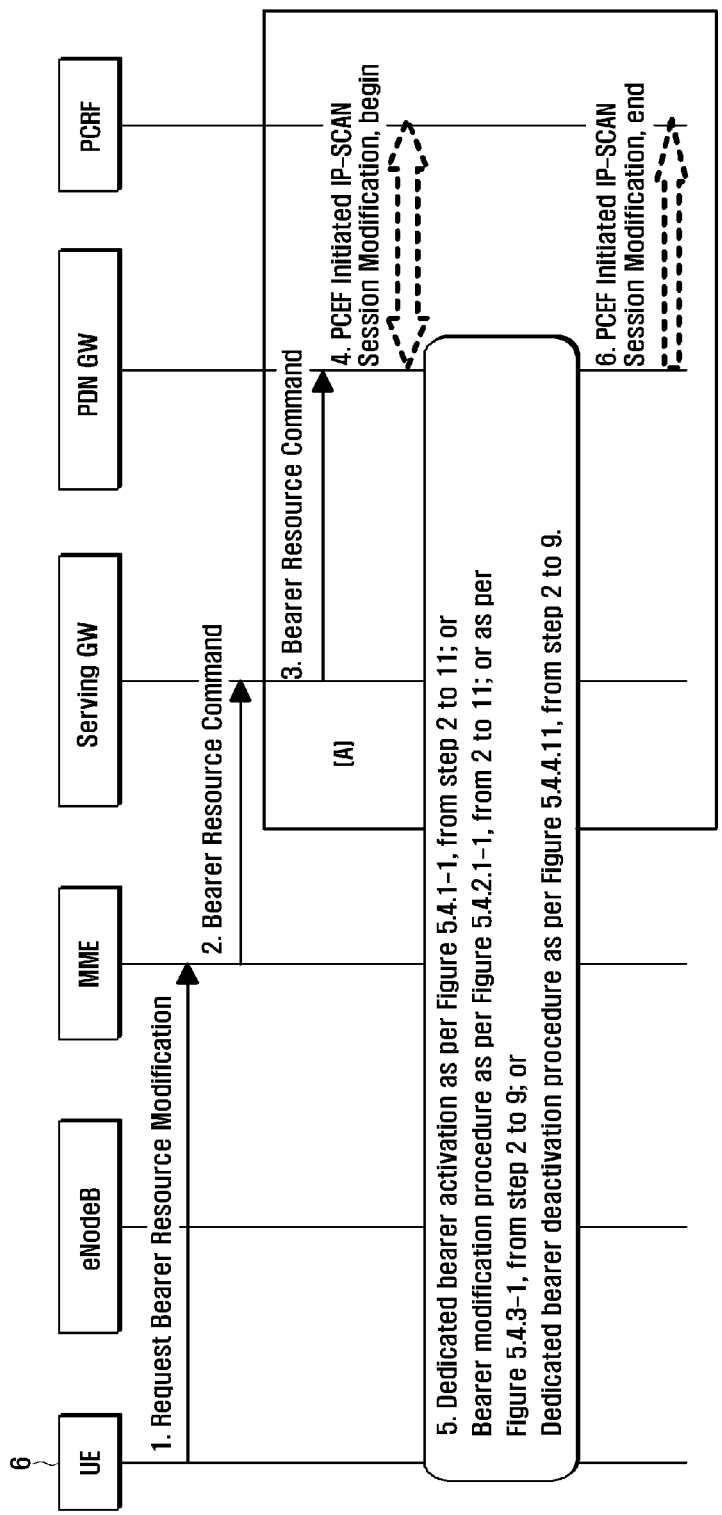
FIG. 2 is a schematic diagram showing user equipment requested bearer resource modification.

In existing systems, there may be three choices for the UE if it receives QoS and especially GBR lower than expected/desired. It may terminate the session e.g. due to expected low quality; it may attempt to continue with lower quality; or it may attempt to initiate UE-initiated bearer resource modification. In current systems, the UE may have the means to request UE-requested resource modification, the signalling flow being illustrated in FIG. 2.

The existing procedures for UE-requested bearer resource modification may not be adequate to allow the UE to succeed in modifying the GBR, since this procedure may not provide enough information to the VPLMN to allow the authorization of the resource modification. For example, in a first case, S9 may not be deployed and the default application value assigned to the application may be insufficient. In a second case, if S9 is deployed, the visited policy and charging rules function (V-PCRF) 10 may not validate the high QoS supplied by the HPLMN over S9, typically from the home policy and charging rules function (H-PCRF) 8, since if the QoS validation fails, the V-PCRF may reject the request and include the QoS-Information AVP to indicate the acceptable QoS. In a third case, the UE may request QoS directly by means of the UE requested resource modification procedure and the V-PCRF may have no reason to validate this request, as it cannot establish that there is a corresponding roaming agreement such that the subscriber will pay more for the added resources, for example beyond the default roaming agreement.

Figure 4:
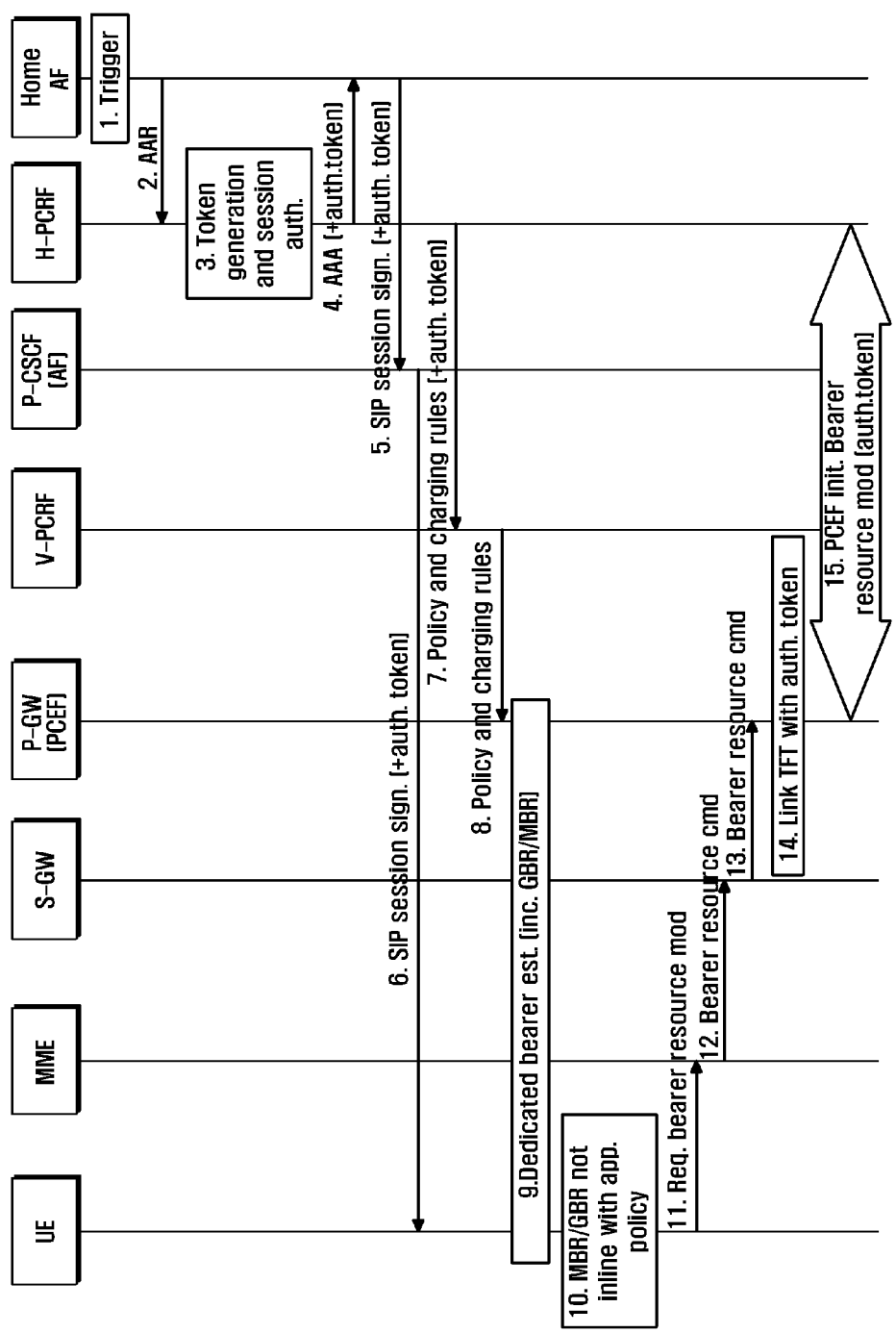
FIG. 4 is a schematic diagram showing user equipment requested resource modification including an authorisation token trigger in an embodiment of the invention.

In an embodiment of the invention, support is provided to the subscriber despite these conditions, by means of an enhanced version of existing UE-initiated procedures, such as a UE requested resource modification procedure. FIG. 4 shows user equipment requested resource modification including an authorisation token trigger in an embodiment of the invention. Such a procedure can be used by the UE to request a GBR higher than the one allocated by VPLMN if the VPLMN does not comply to the application policy that is set by the HPLMN. However, in existing systems, there is no way for the VPLMN in coordination with the HPLMN to confirm and link the UE requested bearer resource modification with any session layer authorization. That is to say that it is not possible for either the UE to know, without trying, that the UE is allowed to perform the UE initiated resource modification procedure or whether the VPLMN will authorize the UE request.

Figure 3:
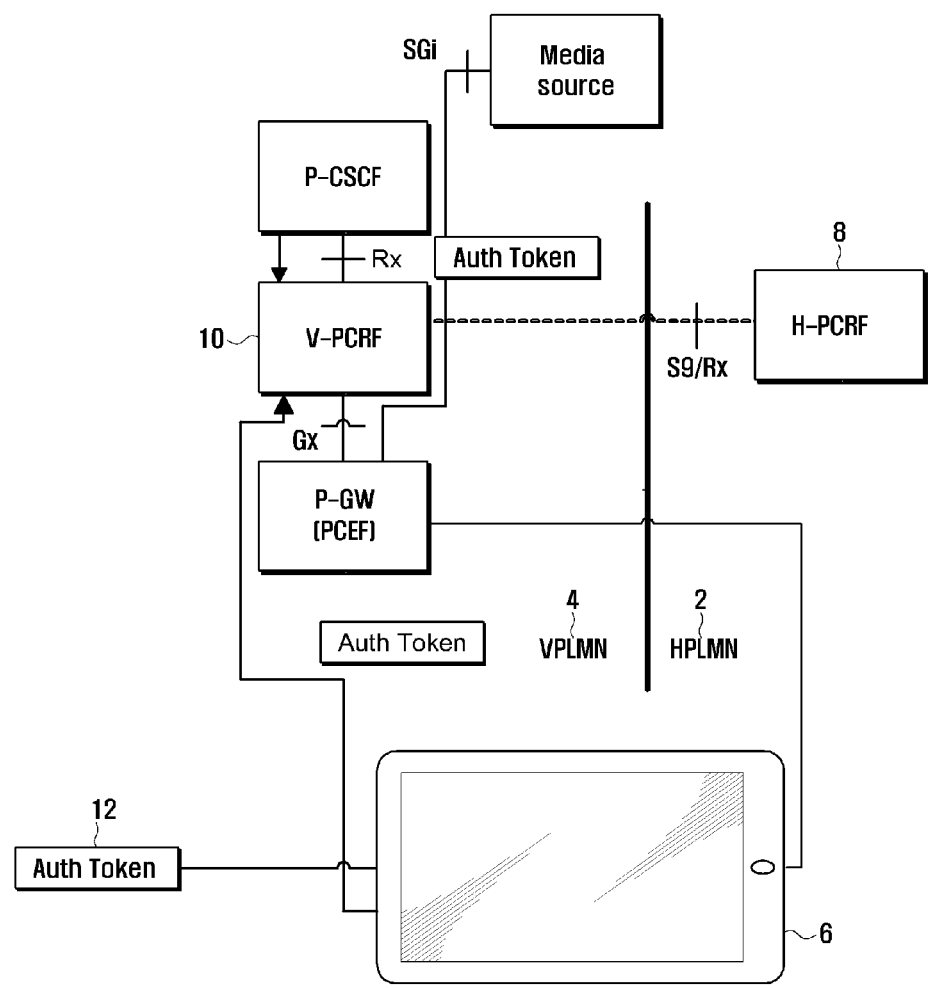
FIG. 3 is a schematic diagram showing user equipment initiated bearer resource modification including an authorisation token in an embodiment of the invention.

In an embodiment of the invention, as illustrated by FIG. 3, an authorization token 12 is used to provide information to the UE 6 to allow it to determine the limits of what QoS is possible and whether the provided QoS was result of HPLMN-provided rules that were validated by the VPLMN (i.e. S9 was used) or purely a default policy in the VPLMN 4 but the VPLMN may upgrade if the user is willing to pay more. The UE 6 requests improved QoS based upon the application requirements known to the upper layers. This request is accompanied by the Authorisation Token. Using this, the V-PCRF 10 can authorize the UE request.

In an embodiment of the invention, an authorization token 12 is provided to the UE 6 as part of the session signalling and may indicate, for example, the following. Firstly, the authorisation may indicate whether it is advised to perform UE-initiated QoS upgrade request and/or the limits of the QoS upgrade the UE can request. The authorisation token may also indicate what associated extra charging is required if/when the UE chooses to perform the UE-initiated QoS upgrade. The mechanism by which the charging information may be provided to the UE may vary. In one embodiment of the invention a charging key can be provided as part of the authorization token; this key can be used by the UE in order to extract human readable charging information. In another embodiment the charging key can contain a URL that would be used by the UE in order to derive the human readable information. The authorisation token may also indicate whether S9 signalling was used in order to validate the QoS rules provided to avoid unnecessary signalling when S9 was used, and to identify that it may be useful to perform a UE-initiated resource modification procedure if S9 was not used. When SIP used, the signalling format may be similar to the format shown in FIG. 10.

In another embodiment of the invention the authorization token may be provided and pre-configured in the UE with means other than AF-signalling. In this case the information may not be session specific, but instead it may apply in all the sessions the UE may initiate. Alternatively, the QoS may apply to a subset of sessions, for example to sessions belonging to a specific application. In this embodiment the VPLMN may also be configured with the same values in order to allow the UE-initiated bearer resource modification when the UE initiates it.

An embodiment of the invention allows the UE and the user to choose whether a QoS upgrade is desirable subject to certain charging implications. An embodiment of the invention also allows the UE to use this authorization token as a trigger in order to determine whether any request for QoS modification/upgrade will have any chances of success. This may eliminate unnecessary signalling from the UE when a request for QoS upgrade is not going to be accepted.

An embodiment of the invention allows the use of pre-configured default rules for the mainstream use of IMS services when S9 is not deployed, e.g. by IR.92 protocols, and when S9 is used, the negotiation using S9 between VPLMN and HPLMN is allowed. Furthermore, an embodiment of the invention allows the HPLMN the give the choice to the UE to attempt UE initiated bearer resource modification to request for higher GBR if the GBR that is provided by the VPLMN is not satisfactory, and allows the VPLMN to differentiate between arbitrary UE-initiated resource requests that have been authorized by the HPLMN and are subject to some limits within the roaming agreement from those that the UE generates autonomously.

Figure 5:
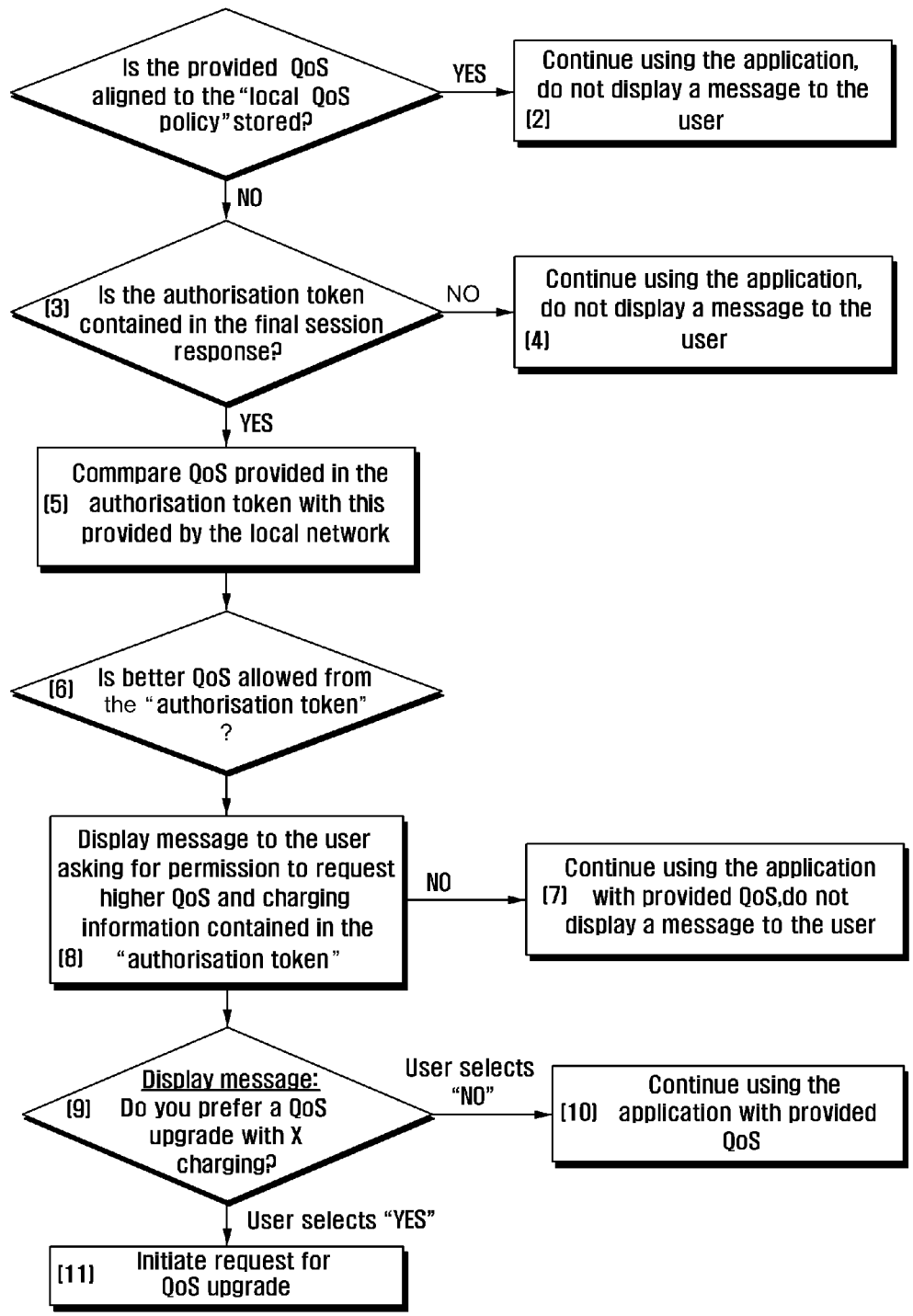
FIG. 5 is a schematic diagram showing processing logic for an authorisation token in a user equipment when an authorisation token is included in Application Function (AF) signalling in an embodiment of the invention.
Figure 6:
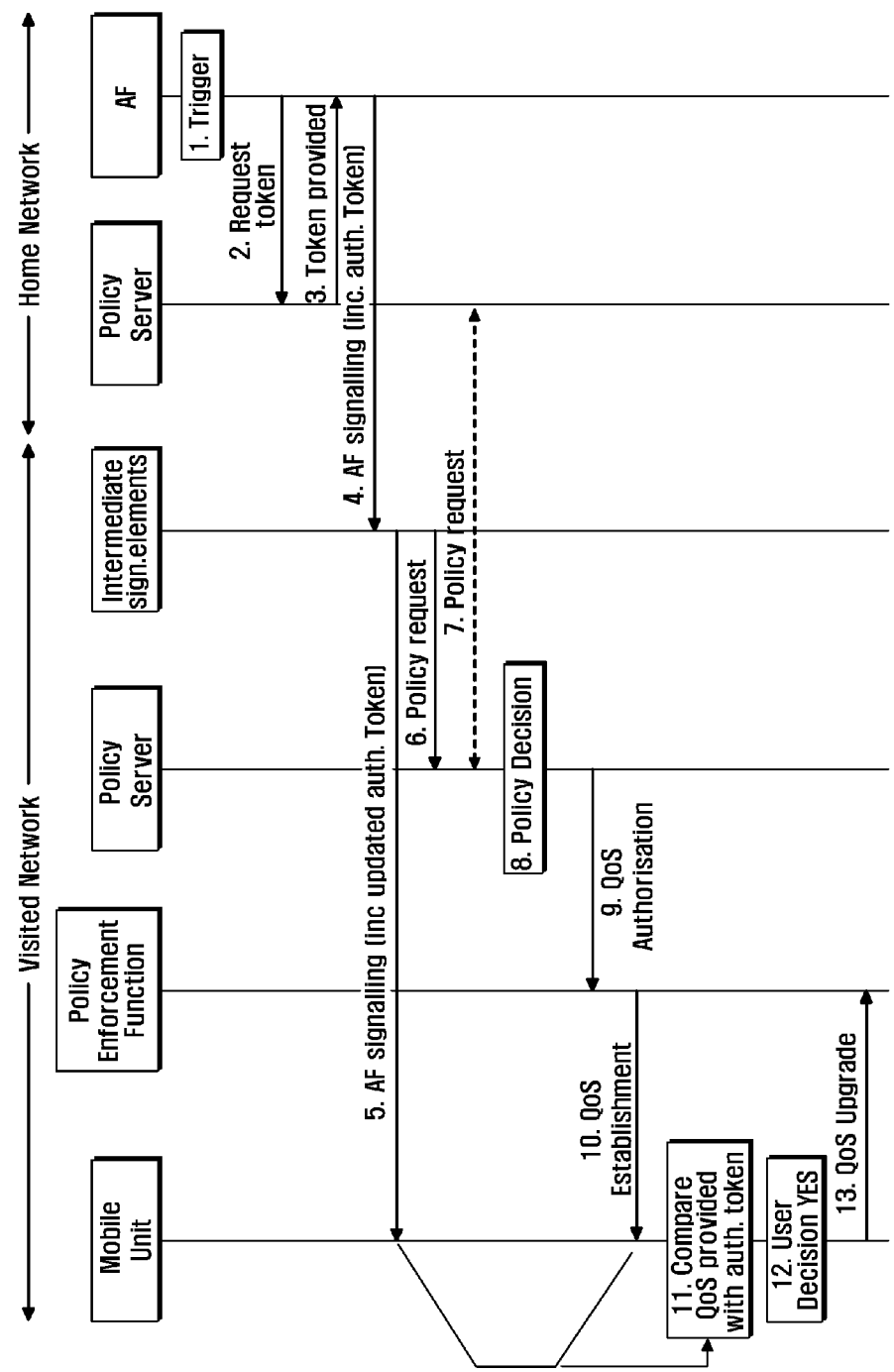
FIG. 6 is a schematic diagram showing signalling flow for providing an authorisation token for triggering a quality of service modification in an embodiment of the invention.
Figure 7:
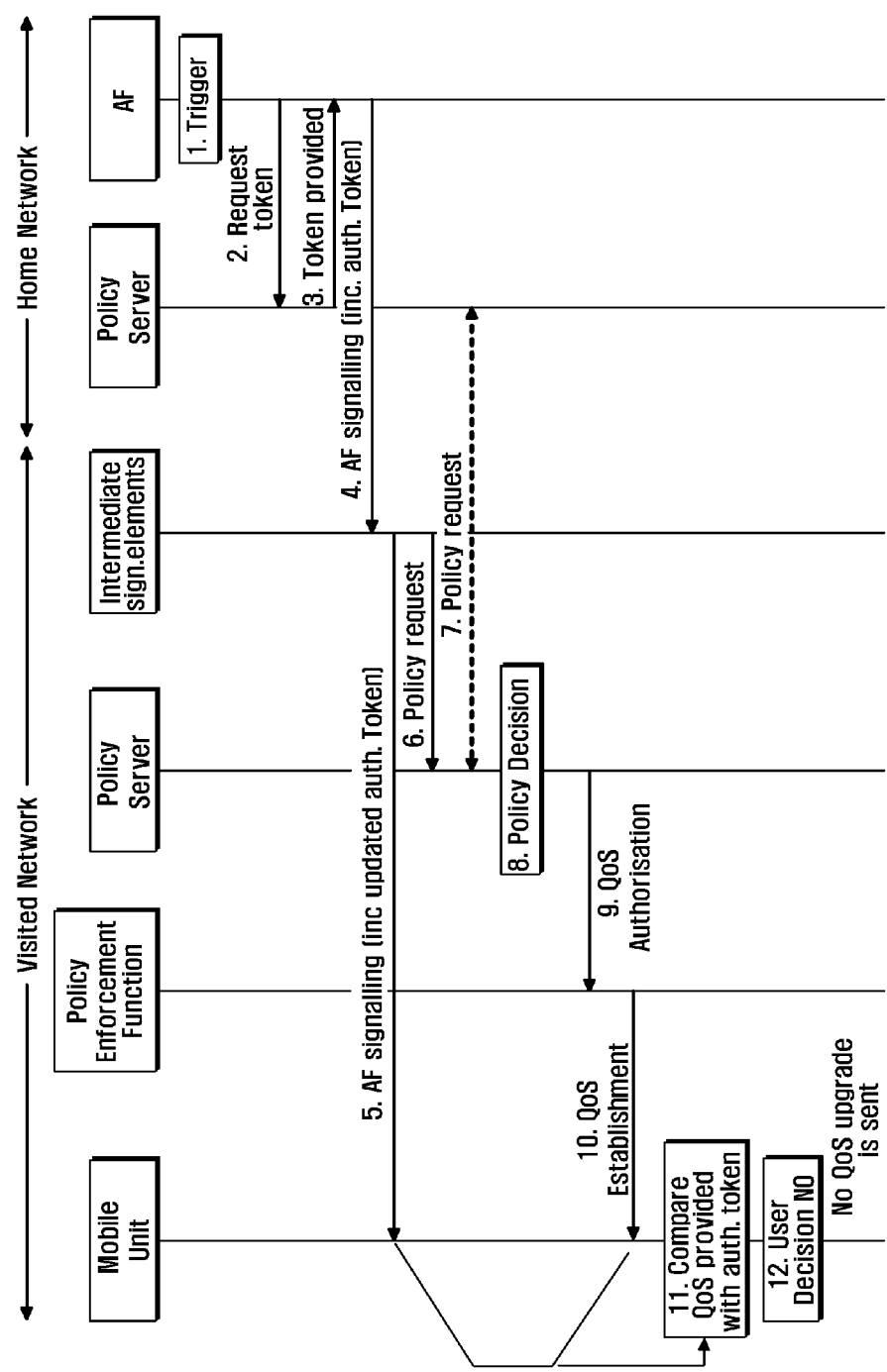
FIG. 7 is a schematic diagram showing signalling flow for providing an authorisation token in which a user decides no quality of service upgrade is required in an embodiment of the invention.
Figure 8:
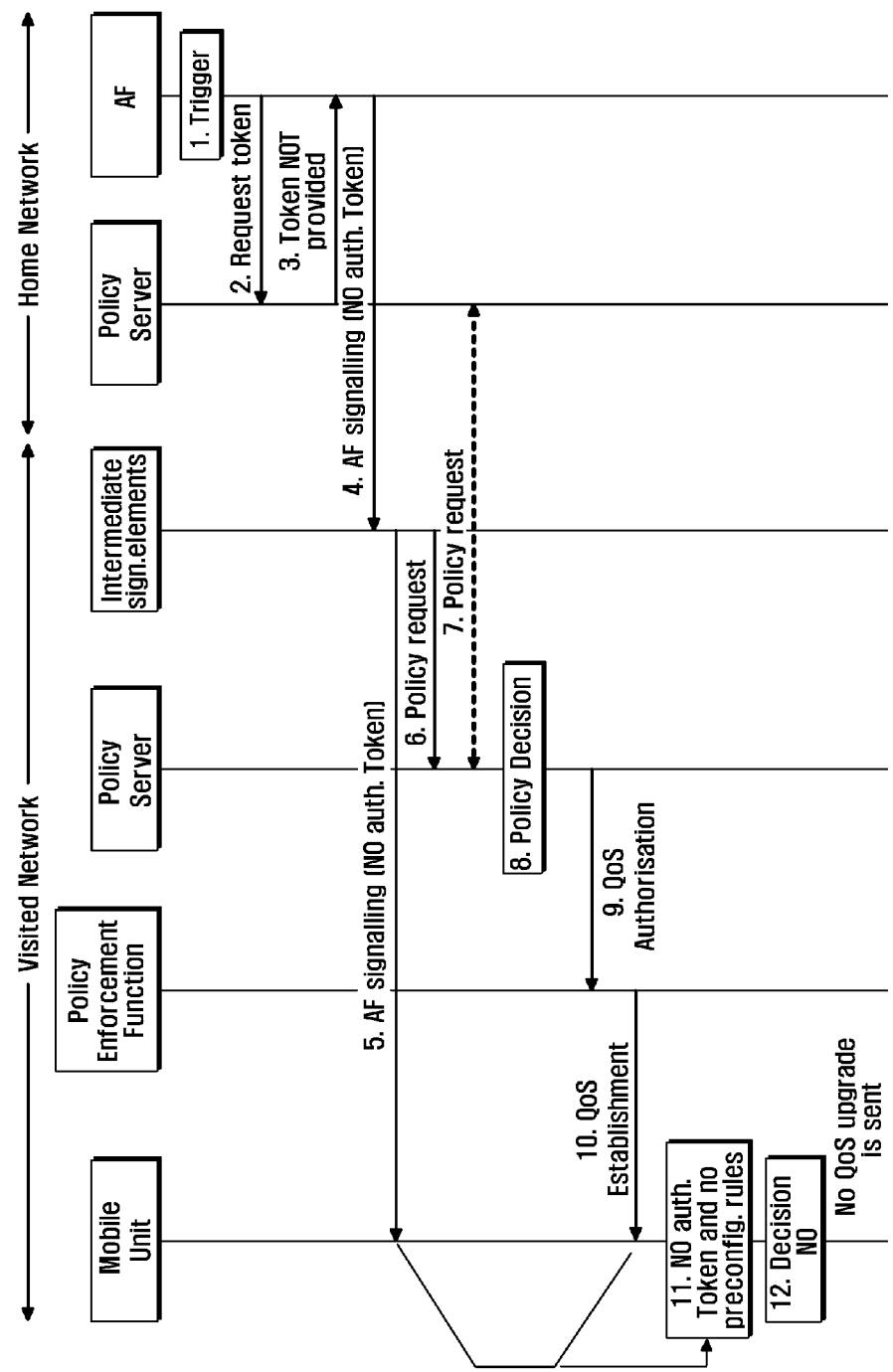
FIG. 8 is a schematic diagram showing signalling flow for the case where an authorisation token is not provided as a decision of the home network and no preconfigured rules exist in an embodiment of the invention.
Figure 11:
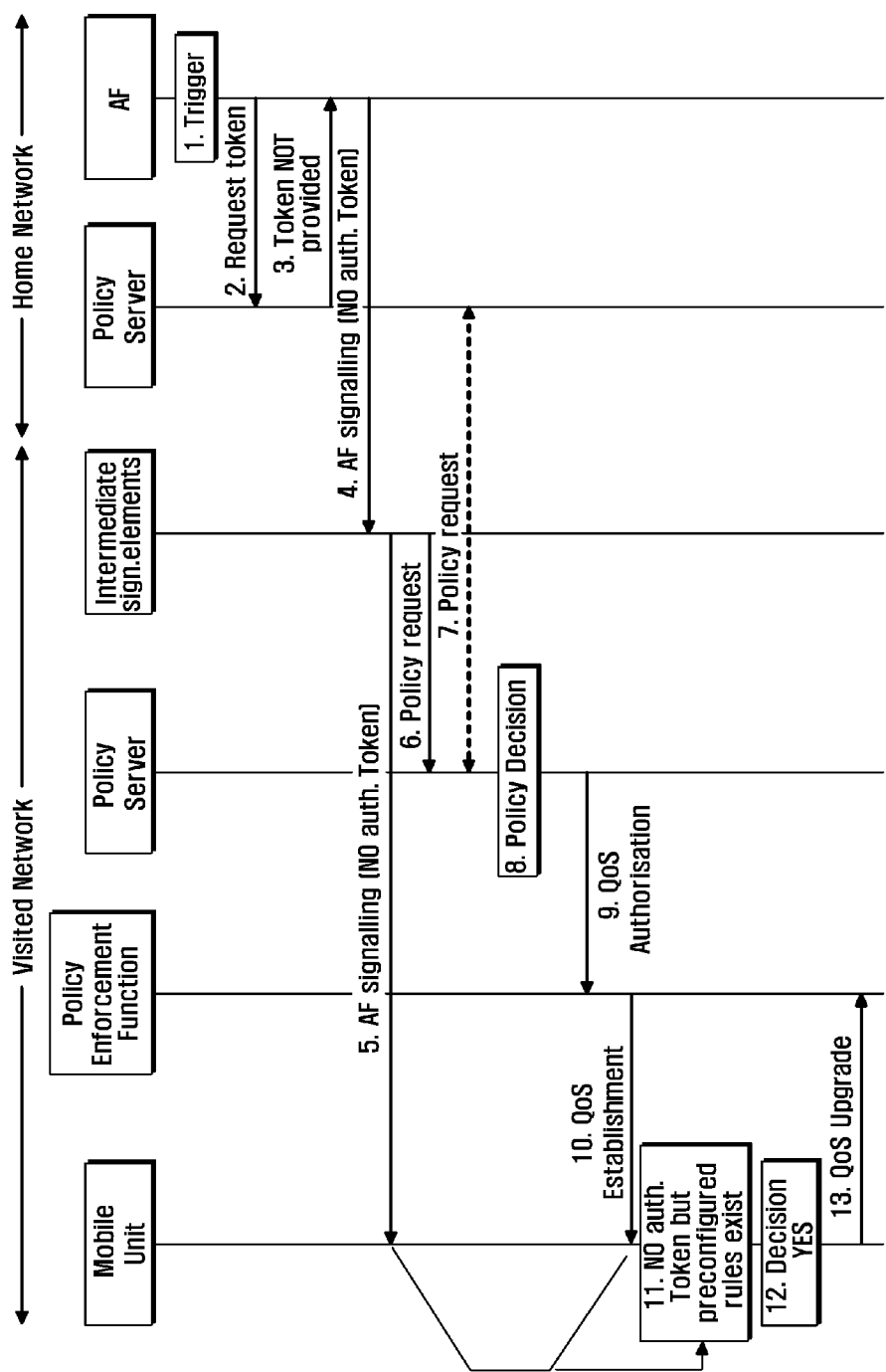
FIG. 11 is a schematic diagram showing signalling flow for the case where a an authorisation token is not provided, but preconfigured rules exist, a decision to request a quality of service upgrade being based on the preconfigured rules.
Figure 12:
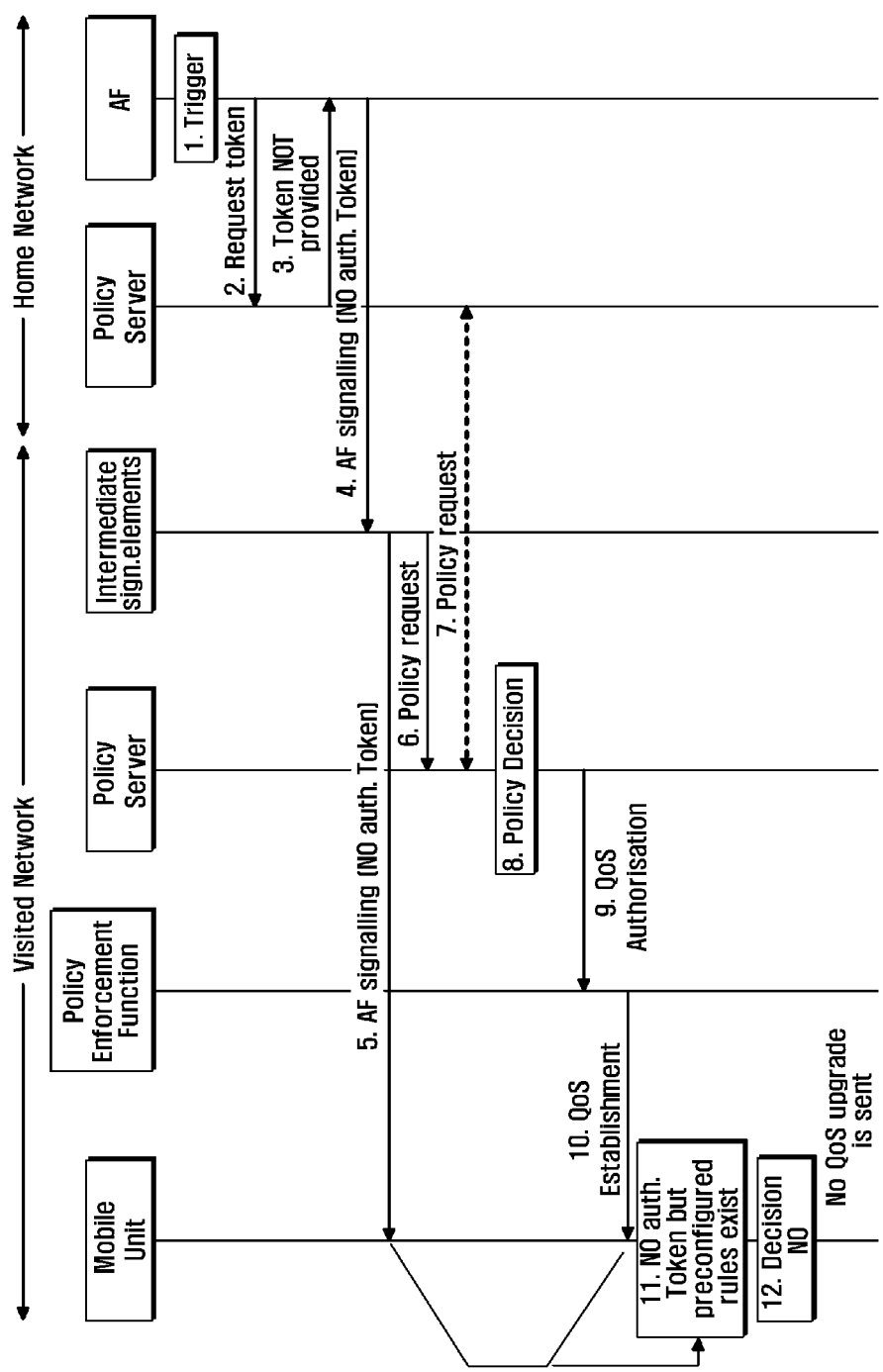
FIG. 12 is a schematic diagram showing signalling flow for the case where a an authorisation token is not provided, but preconfigured rules exist, a decision not to request a quality of service upgrade being based on the preconfigured rules.

FIG. 5 illustrates processing logic for an authorisation token in a user equipment when an authorisation token is included in Application Function (AF) signalling in an embodiment of the invention. The processing logic illustrated in FIG. 5 may apply if the UE gets an indication in AF (e.g. SIP) authorization, e.g. an authorization token, or alternatively the authorization token may be preconfigured in the UE (e.g. as part of the application installation) as illustrated in the FIGS. 6, 7, 8, 11 and 12, and if the UE is using lower QoS than desired (as may be expected from HPLMN policy). A UE-initiated bearer resource modification may be sent to get the upgrade subject to some additional charging. FIG. 6 shows signalling flow for providing an authorisation token for triggering a quality of service modification, and FIG. 7 shows signalling flow for providing an authorisation token in which a user decides no quality of service upgrade is required. FIG. 8 shows signalling flow for the case where an authorisation token is not provided as a decision of the home network and no preconfigured rules exist in an embodiment of the invention. FIG. 11 showing signalling flow for the case where a an authorisation token is not provided, but preconfigured rules exist, and a decision to request a quality of service upgrade is based on the preconfigured rules, and FIG. 12 illustrates the case where a decision not to request a quality of service upgrade is based on the preconfigured rules.

The VPLMN can use the token that is provided at AF (e.g. SIP) authorization in order to validate the UE initiated QoS modification. If SIP is used a P-header can be used in a format for example as shown in FIG. 10.

In an embodiment the authorization token may help to provide an indication to the UI of the device that an upgrade of quality of service may be allowed. In this case the UE may initiate the UE-initiated bearer resource modification procedure on demand from the UI with more chances of success since both VPLMN and HPLMN would understand, based on the existence of the token, why the upgrade is performed. It may also be used in order to correlate the additional charging in OCS etc.

If the indication is sent (e.g. by the AF in SIP messages), such that the UE is aware whether S9 is used or not used, this could influence the UE's decision to attempt to upgrade the QoS. If S9 is not used, this attempt is likely to succeed. If S9 is used, the UE-initiated resource request is likely to be unnecessary.

In another embodiment of the invention the UE and VPLMN may be preconfigured with the allowed QoS limits for specific applications (e.g. MTSI) and compare the QoS provided by the VPLMN with these preconfigured limits. When preconfigured rules exist the authorization token provided by the HPLMN in AF signalling may be considered to take precedence compared to the preconfigured one.

Existing systems lack a defined trigger for UE-initiated Bearer resource modification; use of this existing procedure is implementation specific. Some UEs may attempt and succeed, whereas others do not attempt the procedure and continue to use lower than the desired GBR.

In an embodiment of the invention, the AF and UE may include an authorization token that may provide the capability to the UE to obtain better than the QoS parameters that were allocated by the VPLMN (e.g. GBR, MBR). The authorization token may be used for the obtaining more desirable values for the GBR, MBR parameters when the VPLMN does not have enough information (e.g. service info) and allocates values not in line with the local application policy in the UE.

Embodiments of the invention will now be described with particular reference to the user equipment. The user equipment, typically a mobile station, is arranged to compare the QoS information contained in the authorisation token with the QoS information that was provided by the visited network at the bearer setup. In one embodiment of the invention the authorization token can be contained in the application session signalling, and in another embodiment of the invention the authorization token can be pre-configured by the HPLMN in the mobile station prior to receiving the application session signalling. Open Mobile Alliance (OMA) Device Management (DM) protocol can be used in order to pre-configure the authorization token from the HPLMN.

In an embodiment of the invention, it is determined whether or not to issue a UE initiated request, based on received information on whether S9 signalling is or is not deployed. If the authorisation token allows for higher QoS request QoS upgrade, then a message may be displayed to the user including charging information. If the user decides that QoS upgrade is required, then a request for QoS upgrade may be sent. The application may make decisions whether to upgrade or not based on some pre-configured rules by the user in the application settings. An authorization token may be stored locally at the user equipment, that is configured with the UE and included in a UE initiated resource request procedure as required by the upper layers and user choice. The maximum authorized QoS policy in the authorisation token may be considered when determining the requested QoS in the UE-initiated resource request procedure. The UE may limit its request in view of the maximum authorised QoS. The upper layers may provide QoS information regarding QoS requirements for acceptable performance. This information, together with the maximum information in the authorisation token may determine the appropriate parameters in the UE-initiated resource request to the network, and whether such a request is needed at all. For example, if the application needs X but the auth token only allows Y, where Y<X, then a request is unnecessary.

In an embodiment of the invention, a charging key is provided, and the UE may use the charging key in order to derive human readable information related to extra charging involved when/if the user chooses to upgrade to higher QoS.

Embodiments of the invention will now be described with particular reference to an application function (AF) in a visited network. The application function may store the authorization token that is provided in AF signalling from the home network, provide authorization to a policy server in the visited network, and may modify the authorization token to include information on whether or not the QoS decision is reached after validation of rules from Home Network, for example whether S9 signalling was used or not.

Considering now a policy server in a visited network, in an embodiment of the invention, a policy server in a visited network may match authorization token QoS information with any QoS upgrade that is requested by the UE; validate the authorization token and generate the appropriate PCC rules to authorize resource allocation, and configure local enforcement and corresponding charging. In one embodiment of the invention the policy server in the visited network may explicitly validate the authorization token based on information included in the token itself. This information may include, for example, a digital signature or a certificate.

In another embodiment of the invention, a policy server in the visited network may implicitly validate the authorization token based on the existence of a trust relationship between the home and visited networks based on the existence of a roaming agreement that may involve honouring each other's authorization tokens. Authorization tokens may contain an explicit means by which to verify the authenticity of the source for example a digital signature. The policy server may match the UE QoS upgrade from unique information in the UE's request implicitly, for example using the TFT, or explicitly, for example using a unique identifier contained in the token and QoS upgrade request.

In an embodiment of the invention, a policy server in home network may decide whether an authorization token is required based on the service description that is provided by the AF in Home network, and generate a token with policy corresponding to the UE's maximum QoS parameters allowed and a corresponding charging key. The token generation may take into account which PLMN the UE is currently visiting, since the roaming policy might vary.

As has been described, in an embodiment of the invention, an application function (AF) in a visited network may provide an authorisation token as part of AF signalling. If the application function is an IMS AS, it may for example use a P-header such as that shown in FIG. 10. An indication is provided to the UE as part of session signalling, for example using Session Initiation Protocol (SIP), whether or not the QoS authorization has involved interaction with the HPLMN to validate the rules from HPLMN, or whether it was only default local VPLMN policy that was used. The indication may be, for example, an indication as to whether S9 signalling was used or not. On the basis of the indication, the UE may to determine whether to use rest of the QoS information that is contained in the authorization token. For example if the parameter indicated that S9 is used then the UE may be prevented from initiating a UE-initiated bearer resource modification despite the rest of QoS information that was provided in the authorization token.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of quality of service control for a user equipment in a communication system comprising a first network and a second network, the first network being a home network with respect to said user equipment and the second network being a visited network with respect to said user equipment, the method comprising:
receiving authorisation information at said user equipment from the first network, said authorisation information having data related to an entitlement to quality of service for said user equipment;
holding said authorisation information at said user equipment;
performing a comparison of said entitlement to quality of service with a quality of service provided by the second network; and
in dependence on said comparison, sending a message from said user equipment to the second network requesting an upgrade of quality of service.

2. The method according to claim 1, wherein said receiving of said authorisation information at said user equipment is as a result of application session signalling.

3. The method according to claim 2, wherein said application session signalling is Session Initiation Protocol (SIP).

4. The method according to claim 1, wherein said receiving of said authorisation information at said user equipment is as a result of a pre-configuration of said user equipment by the first network.

5. The method according to claim 4, wherein said pre-configuration is performed using Open Mobile Alliance (OMA) Device Management (DM) protocol.

6. The method according to claim 4, wherein said pre-configuration is performed prior to receiving application session signalling at said user equipment.

7. The method according to claim 1, wherein said sending of the message from said user equipment to the second network requesting the upgrade of quality of service is in further dependence on a determination that the quality of service provided by the second network has been set by reference to rules received from the first network.

8. The method according to claim 7, wherein said determination that the quality of service provided by the second network has been set by reference to rules received from the first network is based on information received at said user equipment relating to whether or not a given signalling link is deployed between the first and second networks.

9. The method according to claim 8, wherein said given signalling link is a S9 link.

10. The method according to claim 1, wherein said sending of the message from said user equipment to the second network requesting the upgrade of quality of service is in further dependence on an input from a user of the user equipment requesting an upgrade of quality of service.

11. The method according to claim 10, comprising displaying a message to the user conveying charging information, whereby the user may decide whether or not to request an upgrade of quality of service.

12. The method according to claim 11, wherein said message to the user conveying charging information is determined on the basis of receipt of a charging key from the second network.

13. The method according to claim 1, wherein said sending of the message from said user equipment to the second network requesting the upgrade of quality of service is in further dependence on a pre-configured rule held at the user equipment.

14. The method according to claim 13, wherein said pre-configured rule is configured by the user as an application setting of the user equipment.

15. The method according to claim 1, wherein said sending of the message from said user equipment to the second network requesting the upgrade of quality of service is in accordance with a resource request procedure configured at the user equipment.

16. The method according to claim 1, wherein said sending of the message from said user equipment to the second network requesting the upgrade of quality of service is in further dependence on an indication of a quality of service requirement for acceptable performance received from the second network.

17. The method according to claim 1, comprising:
sending said authorisation information from the first network to the second network, whereby the second network may authorise the requested upgrade of quality of service.

18. The method according to claim 17, wherein said sending of said authorisation information from the first network to the second network is by application function (AF) signalling.

19. The method according to claim 17, comprising:
holding said authorisation information at an application function of the second network; and
providing authorisation for the requested upgrade from the application function to a policy server in the second network.

20. The method according to claim 19, comprising:
modifying said authorisation information held at the application function to include information as to whether the quality of service provided by the second network has been set by reference a rule received from the first network.

21. The method according to claim 19, comprising:
validating said authorisation information received by the second network from said user equipment at the policy server of the second network.

22. The method according to claim 21, comprising:
performing said validating based on a digital signature contained in said authorisation information.

23. The method according to claim 19, comprising:
authorising resource allocation at the policy server dependent on a comparison of the upgrade of quality of service requested by the user equipment and the information related to an allowed quality of service carried by said authorisation information.

24. The method according to claim 1, comprising:
sending said authorisation information from said user equipment to the second network, whereby the second network may authorise the requested upgrade.

25. The method according to claim 1, wherein said authorisation information constitutes at least part of an authorisation token.

26. The method according to claim 1, wherein said authorisation information relates to a Guaranteed Bit Rate (GBR) or a Maximum Bit Rate (MBR) to which the user equipment is entitled.

27. The method according to claim 1, wherein said authorisation information relates to charging information for an upgrade.

28. The method according to claim 1, wherein said authorisation information relates to whether or not a given signalling link is deployed between the first and second networks.

29. The method according to claim 28, wherein said given signalling link is a S9 link.

30. The method according to claim 1, wherein said communication system is a wireless communication system, said first network is a wireless network and said second network is a wireless network.

31. The method according to claim 1, wherein said authorisation information relates to an upgrade limit.

32. The method according to claim 1, wherein said entitlement to a quality of service relates to a service for said user equipment.

33. A user equipment for use in a communication system comprising a first network and a second network, the first network being a home network with respect to said user equipment and the second network being a visited network with respect to said user equipment, the user equipment being arranged to:
receive authorisation information from the first network, said authorisation information having data related to an entitlement to quality of service for said user equipment;
hold said authorisation information;
perform a comparison of said entitlement to quality of service with a quality of service provided by the second network; and
in dependence on said comparison, send a message to the second network requesting an upgrade of quality of service.

34. A server for use in a communication system comprising a first network and a second network, the first network being a home network with respect to a given user equipment and the second network being a visited network with respect to the given user equipment, the server being arranged to:
- receive a message from the given user equipment requesting an upgrade of quality of service;
- perform a comparison of said requested upgrade to authorisation information having information related to an allowed quality of service for the given user equipment; and
- authorise resource allocation dependent on said comparison.

* * * * *